United States Patent
Lee et al.

(10) Patent No.: US 12,014,059 B2
(45) Date of Patent: Jun. 18, 2024

(54) STORAGE DEVICES, METHODS OF OPERATING STORAGE DEVICES, AND METHODS OF OPERATING HOST DEVICES

(71) Applicant: Samsung Electronics Co., Ltd., Suwon-si (KR)

(72) Inventors: Kyung-Jin Lee, Seoul (KR); Ji Soo Kim, Seongnam-si (KR); Kyung-Woo Noh, Yongin-si (KR); Young Hyun Ji, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 148 days.

(21) Appl. No.: 17/815,245

(22) Filed: Jul. 27, 2022

(65) Prior Publication Data

US 2023/0195332 A1  Jun. 22, 2023

(30) Foreign Application Priority Data

Dec. 20, 2021  (KR) .......... 10-2021-0182656

(51) Int. Cl.
*G06F 3/06* (2006.01)
(52) U.S. Cl.
CPC .......... *G06F 3/0623* (2013.01); *G06F 3/0652* (2013.01); *G06F 3/0679* (2013.01)
(58) Field of Classification Search
CPC ...... G06F 3/062; G06F 3/0623; G06F 3/0652; G06F 3/0679; G06F 21/6218; G06F 21/72; G06F 21/79; G06F 2221/2143; H04L 9/0891; H04L 9/0894
USPC ............ 365/185.29, 185.3, 185.33; 711/166
See application file for complete search history.

(56) References Cited

U.S. PATENT DOCUMENTS

| | | | |
|---|---|---|---|
| 8,250,380 B2 | 8/2012 | Guyot et al. | |
| 8,938,624 B2 | 1/2015 | Obukhov et al. | |
| 8,995,654 B2 | 3/2015 | Tang et al. | |
| 9,111,621 B2 | 8/2015 | Krutzik et al. | |
| 9,363,085 B2 | 6/2016 | Offenberg et al. | |
| 9,716,594 B2 * | 7/2017 | Offenberg | G06F 21/6218 |
| 9,830,099 B1 | 11/2017 | Johansson et al. | |
| 2019/0036704 A1 * | 1/2019 | DeVetter | H04L 9/14 |
| 2022/0059130 A1 * | 2/2022 | Griffes | G06F 21/602 |

FOREIGN PATENT DOCUMENTS

JP  2012090231 A  5/2012

* cited by examiner

*Primary Examiner* — Ilwoo Park
(74) *Attorney, Agent, or Firm* — Myers Bigel, P.A.

(57) ABSTRACT

A storage device, a method of operating the storage device, and a method of operating a host device are provided. The storage device includes a nonvolatile memory (NVM) and a storage controller controlling the nonvolatile memory. The storage controller is configured to receive a command from a host device giving instructions to sanitize data with the use of a cryptographic erase. The storage controller is also configured to, in response to a request from the host device, transmit to the host device a first verification value indicative of whether a first media encryption key (MEK) stored in the NVM has been deleted and a second verification value indicative of whether a second MEK, which is different from the first MEK, has been generated and stored in the NVM.

20 Claims, 10 Drawing Sheets

STORAGE DEVICES, METHODS OF OPERATING STORAGE DEVICES, AND METHODS OF OPERATING HOST DEVICES

CROSS-REFERENCE TO RELATED APPLICATION

This application claims priority from Korean Patent Application No. 10-2021-0182656 filed on Dec. 20, 2021, in the Korean Intellectual Property Office, and all the benefits accruing therefrom under 35 U.S.C. 119, the contents of which in its entirety are herein incorporated by reference.

BACKGROUND

1. Technical Field

The present disclosure relates to storage devices, methods of operating the storage devices, and methods of operating host devices.

2. Description of the Related Art

It may be useful to completely delete or "sanitize" data stored in a storage device to safely discard or reuse the storage device at the end of the lifetime of the storage device.

As a sanitization method, a data overwrite, block erase, or cryptographic erase method (also referred to as an encryption deletion method) may be used.

The data overwrite and block erasure methods allow for the restoration of data by reading data from each area accessible to a host and comparing the read data with expected values, but the encryption deletion method deletes media encryption keys (MEKs) used to encrypt data and thus cannot restore the original data.

Meanwhile, the encryption deletion method could use a verification of whether MEKs have been properly deleted, and research is underway into ways to perform such verification reliably.

SUMMARY

Aspects of the present disclosure provide a storage device, an operating method of the storage device, and an operating method of a host device, which are capable of performing a sanitization operation with reliability by using a cryptographic erase.

However, aspects of the present disclosure are not restricted to those set forth herein. The above and other aspects of the present disclosure will become more apparent to one of ordinary skill in the art to which the present disclosure pertains by referencing the detailed description of the present disclosure given below.

According to some aspects of the present disclosure, a storage device is disclosed that comprises a nonvolatile memory (NVM) and a storage controller configured to control the nonvolatile memory, wherein the storage controller is further configured to receive a command giving instructions to sanitize data with the use of a cryptographic erase from a host device and is configured to transmit, to the host device, in response to a command from the host device, a first verification value indicative of whether a first media encryption key (MEK) stored in the NVM has been deleted and a second verification value indicative of whether a second MEK, which is different from the first MEK, has been generated and stored in the NVM.

According to some aspects of the present disclosure, there is disclosed a method of operating a storage device comprising a nonvolatile memory (NVM) configured to store a first media encryption key (MEK) at a first address, wherein the method comprises receiving a command to sanitize data by using a cryptographic erase from a host device, and in response to the command from the host device, transmitting, to the host device, a first verification value indicative of whether the first media encryption key (MEK) stored in the NVM has been deleted and a second verification value indicative of whether a second MEK, which is different from the first MEK, has been generated and stored in the NVM.

According to some aspects of the present disclosure, there is disclosed a method of operating a host device that comprises transmitting, to a storage device including a nonvolatile memory (NVM), a command giving instructions to sanitize data with the use of a cryptographic erase, and receiving, from the storage device, a first verification value indicative of whether a first media encryption key (MEK) stored in the NVM has been deleted and a second verification value indicative of whether a second MEK, which is different from the first MEK, has been generated and stored in the NVM.

It should be noted that the effects of the present disclosure are not limited to those described above, and other effects of the present disclosure will be apparent from the following description.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Embodiments of the present disclosure will hereinafter be described with reference to the accompanying drawings.

Figure 1:
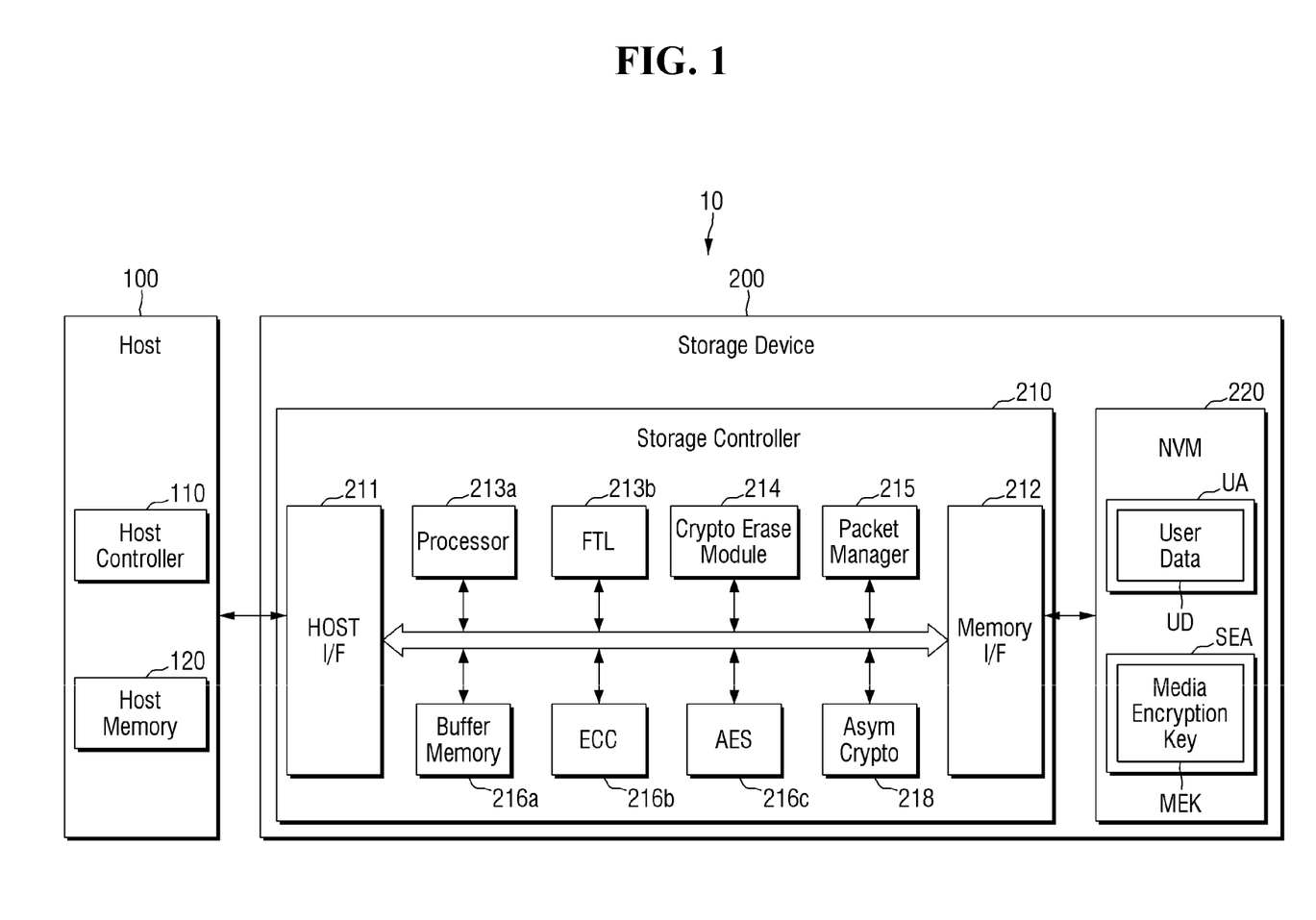
FIG. 1 is a block diagram of a storage system according to some embodiments of the present disclosure.
Figure 2:
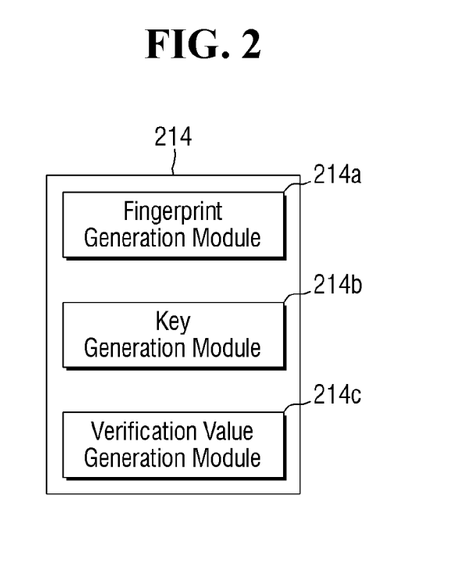
FIG. 2 is a block diagram of a cryptographic erase module of FIG. 1.

FIG. 1 is a block diagram of a storage system according to some embodiments of the present disclosure. FIG. 2 is a block diagram of a cryptographic erase module of FIG. 1

Referring to FIG. 1, a storage system 10 may include a host device 100 and a storage device 200. The storage device 200 may include a storage controller 210 and a nonvolatile memory (NMV) 220. The host device 100 may include a host controller 110 and a host memory 120. The host memory 120 may function as a buffer memory for temporarily storing data to be transmitted to the storage device 200 or data received from the storage device 200.

The storage device 200 may include storage media for storing data upon request from the host device 100. For example, the storage device 200 may include at least one of a solid-state drive (SSD), an embedded memory, and a removable external memory. In a case where the storage device 200 is an SSD, the storage device 200 may be, for example, a storage device complying with the NVM express (NVMe) standard.

In a case where the storage device 200 is an embedded memory or an external memory, the storage device 200 may be a storage device complying with the Universal Flash Storage (UFS) or embedded Multi-Media Card (eMMC) standard. The host device 100 and the storage device 200 may generate and transmit packets in accordance with a standard protocol that they employ.

The NVM 220 of the storage device 200 may include a flash memory, and the flash memory may include a two-dimensional (2D) NAND memory array and/or a three-dimensional (3D) NAND (or vertical NAND) memory array. Alternatively, the storage device 200 may include other various types of NVMs. For example, the storage device 200 may include a magnetic random-access memory (MRAM), a spin-transfer torque MRAM, a conductive bridging random-access memory (CBRAM), a ferroelectric random-access memory (FeRAM), a phase-change random-access memory (PRAM), a resistive random-access memory (RRAM), and the like.

In some embodiments, the host controller 110 and the host memory 120 may be implemented as separate semiconductor chips. Also, in some embodiments, the host controller 110 and the host memory 120 may be integrated into the same semiconductor chip. For example, the host controller 110 may be one of a plurality of modules provided in an application processor, and the application processor may be implemented as a system-on-chip (SoC). The host memory 120 may be an embedded memory included in the application processor or an NVM, or a memory module provided outside of the application processor.

The host controller 110 may manage the operation of storing data from a buffer region (e.g., write data) in the NVM 220 or storing data from the NVM 220 (e.g., read data) in the buffer area.

The storage controller 210 may include a host interface 211 and a memory interface 212. The storage controller 210 may further include a processor 213a, a flash translation layer (FTL) 213b, a cryptographic erase module 214, a buffer memory 216a, an error correction code (ECC) engine 216b, and an advanced encryption standard (AES) engine 216c.

The storage controller 210 may further include a working memory (not illustrated) into which the FTL 213b is loaded, and as the processor 213a executes the FTL 213b, a data write operation and a data read operation for the NVM 220 may be controlled.

The host interface 211 may transmit packets to, and receive packets from, the host device 100. Packets transmitted from the host device 100 to the host interface 211 may include commands or data to be written to the NVM 220, and packets transmitted from the host interface 211 to the host device 100 may include responses to the commands or data read from the NVM 220.

The memory interface 212 may transmit data to be written to the NVM 220 or may receive data read from the NVM 220. The memory interface 212 may be configured to comply with a standard protocol such as Toggle or the Open NAND Flash Interface (ONFI).

The FTL 213b may perform various functions such as address mapping, wear leveling, and garbage collection. Address mapping is a process of translating logical addresses received from the host device 100 into physical addresses for use in storing data in the NVM 220.

Wear leveling, which is a technique of allowing blocks in the NVM 220 to be evenly used to prevent an excessive deterioration of particular blocks, may be realized by firmware technology for balancing the erase counts of physical blocks. Garbage collection is a technique for securing available storage capacity in the NVM 220 by copying valid data in existing blocks to new blocks and erasing the existing blocks.

In a case where the storage controller 210 receives a sanitize command from the host device 100, the cryptographic erase module 214 may perform a cryptographic erase operation that deletes media encryption keys (MEKs) stored in a secure area SEA of the NVM 220. In some embodiments, the cryptographic erase module 214 may be implemented as software or firmware, but the present disclosure is not limited thereto.

Referring to FIGS. 1 and 2, the cryptographic erase module 214 may include a fingerprint generation module 214a, a key generation module 214b, and a verification value generation module 214c. At least some of the fingerprint generation module 214a, the key generation module 214b, and the verification value generation module 214c may be implemented as, for example, software, but the embodiments of present disclosure are not limited thereto.

The fingerprint generation module 214a may generate a fingerprint for data stored at a particular address in the NVM 220. For example, the fingerprint generation module 214a may generate a hash value based on the data stored at the particular address in the NVM 220 and may output the hash value as a fingerprint for the particular address in the NVM 220.

The key generation module 214b may generate MEKs to be stored in the secure area SEA of the NVM 220. For example, the key generation module 214b may generate MEKs by using a random number generator.

The verification value generation module 214c may generate verification values based on fingerprints generated by the fingerprint generation module 214a. For example, the verification value generation module 214c may generate a first verification value indicating that an MEK stored in the secure area SEA of the NVM 220 has been deleted and a second verification value indicating that a new MEK has been stored in the secure area SEA of the NVM 220.

In some embodiments, the verification values generated by the verification value generation module 214c may include 1-bit data. For example, if the first verification value is 0, it may indicate that an MEK stored in the secure area SEA of the NMV 220 has not yet been deleted. For example, if the first verification value is 1, it may indicate that an MEK stored in the secure area SEA of the NMV 220 has been deleted.

For example, if the second verification value is 0, it may indicate that a new MEK has not yet been stored in the secure area SEA of the NMV 220. For example, if the second verification value is 1, it may indicate that a new MEK has been stored in the secure area SEA of the NMV 220.

However, the embodiments of present disclosure are not limited to these examples, and the type of verification values generated by the verification value generation module 214c may vary.

FIG. 2 illustrates that the cryptographic erase module 214 includes the fingerprint generation module 214a, the key generation module 214b, and the verification value generation module 214c, but the configuration of the cryptographic erase module 214 may vary.

The operation of the cryptographic erase module 214 will be described later in detail.

Referring again to FIG. 1, a packet manager 215 may generate packets in accordance with an interface protocol negotiated with the host device 100 or may parse various types of information from packets received from the host device 100.

The buffer memory 216a may temporarily store data to be written to the NVM 220 or data read from the NVM 220. The buffer memory 216a may be provided in the storage controller 210 or may be outside of the storage controller 210.

The ECC engine 216b may perform an error detection/correction function on read data, which is data read from the NVM 220. For example, the ECC engine 216b may generate parity bits for write data, which is data to be written to the NVM 220, and the generated parity bits may be stored in the NVM 220 together with the write data. During the reading of the read data from the non-volatile memory 220, the ECC engine 216b may correct error in the read data with the use of parity bits read from the NVM 220 and may output the error-corrected read data.

The AES engine 216c may perform at least one of an encryption operation and a decryption operation on data input to the storage controller 210, by using a symmetric key algorithm.

The AES engine 216c may encrypt data provided by the host device 100, with an MEK stored in the secure area SEA of the NVM 220. The encrypted data may be stored in a user area UA of the NVM 220 as user data UD.

The AES engine 216c may decrypt user data UD stored in the user area UA of the NVM 220 with an MEK stored in the secure area SEA of the NVM 220. The data decrypted by the AES engine 216c may be transmitted to the host device 100.

The user area UA of the NVM 220 may be an area accessible to the host device 100, and the secure area SEA may be an area inaccessible to the host device 100. That is, the host device 100 may access user data UD stored in the user area UA of the NVM 220, but may not access MEKs stored in the secure area SEA of the NVM 220 with logical addresses.

An asymmetric cryptographic module 218 may perform an asymmetric cryptographic operation by using an asymmetric key algorithm. And the operation of the asymmetric cryptographic module 218 may thus be distinguished from the AES engine 216c, which performs a cryptographic operation by using a symmetric key algorithm.

Private keys generated in the storage device 200 may be stored in the asymmetric cryptographic module 218 and may be used in a cryptographic operation performed by the asymmetric cryptographic module 218.

Figure 3:
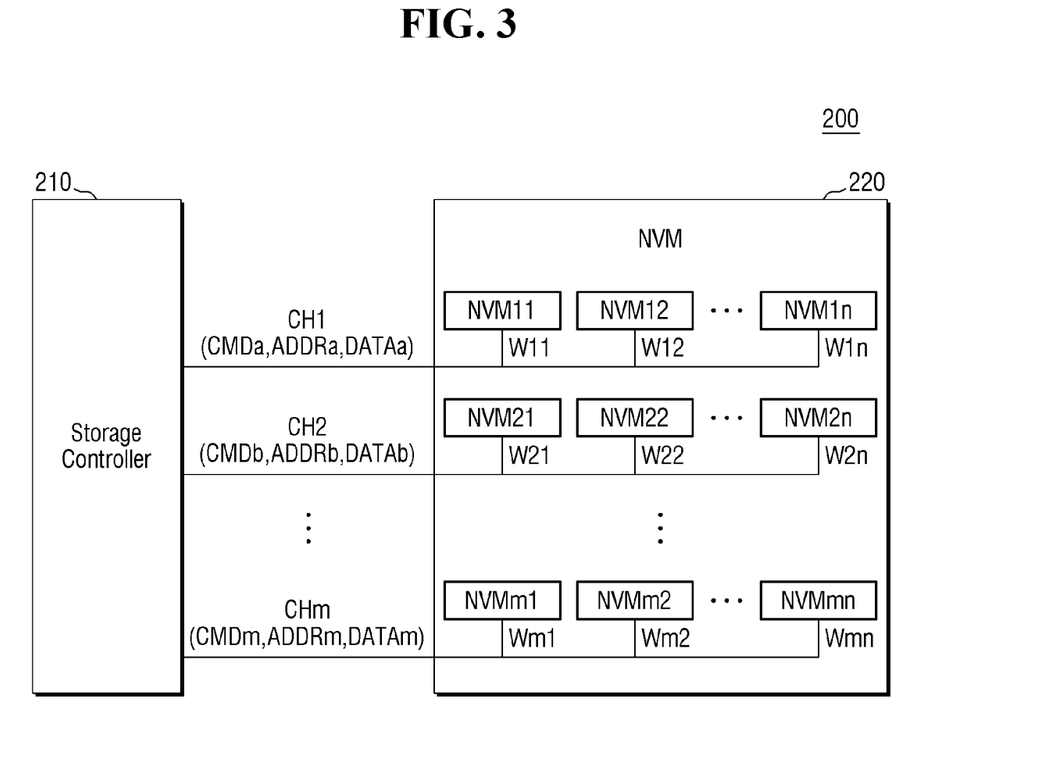
FIG. 3 is a block diagram illustrating a storage controller and a nonvolatile memory (NVM) of the storage device of FIG. 1

FIG. 3 is a block diagram illustrating the storage controller and the NVM of the storage device of FIG. 1.

Referring to FIG. 3, the storage device 200 may include the NVM 220 and the storage controller 210. The storage device 200 may support a plurality of first through m-th channels CH1 through CHm, and the NVM 220 and the storage controller 210 may be connected via the first through m-th channels CH1 through CHm. For example, the storage device 200 may be implemented as an SSD.

The NVM 220 may include a plurality of NVM devices (NVM11 through NVMmn). Each of the NVM devices (NVM11 through NVMmn) may be connected to one of the first through m-th channels CH1 through CHm via a corresponding way. For example, first NVM devices NVM11 through NVM1n may be connected to the first channel CH1 via first ways W11 through W1n, respectively, and second NVM devices NVM21 through NVM2n may be connected to the second channel CH2 via second ways W21 through W2n, respectively. The NVM devices (NVM11 through NVMmn) may be implemented as arbitrary memory units that can operate in response to individual commands from the storage controller 210. For example, the NVM devices (NVM11 through NVMmn) may be implemented as chips or dies, but the present disclosure is not limited thereto.

The storage controller 210 may transmit signals to, or receive signals from, the NVM 220 via the first through m-th channels CH1 through CHm. For example, the storage controller 210 may transmit commands (CMDa through CMDm), addresses (ADDRa through ADDRm), and data (DATAa through DATAm) to the NVM 220 or may receive the data (DATAa through DATAm) from the NVM 220.

The storage controller 210 may select one of the NVM devices (NVM11 through NVMmn) via each of the first through m-th channels CH1 through CHm and may transmit signals to, or receive signals from, the selected NVM device. For example, the storage controller 210 may select one of the first NVM devices NVM11 through NVM1n, which are connected to the first channel CH1, for example, the first NVM device NVM11. Then, the storage controller 210 may transmit a command CMDa, an address ADDRa, and data DATAa to the first NVM device NVM11 via the first channel CH1 or may receive the data DATAa from the first NVM device NVM11 via the first channel CH1.

The storage controller 210 may transmit signals to, or receive signals from, the NVM 220 in parallel. For example, the storage controller 210 may transmit a command CMDb to the NVM 220 via the second channel CH2 while transmitting the command CMDa to the NVM 220 via the first channel CH1. For example, the storage controller 210 may receive data DATAb from the NVM 220 via the second channel CH2 while receiving the data DATAa from the NVM via the first channel CH1.

The storage controller 210 may control the general operation of the NVM 220. The storage controller 210 may transmit signals to the first through m-th channels CH1 through CHm and may thus control the NVM devices (NVM11 through NVMmn), which are connected to the first through m-th channels CH1 through CHm. For example, the storage controller 210 may transmit the command CMDa and the address ADDRa to the first channel CH1 and may thus control one of the first NVM devices NVM11 through NVM1n.

The NVM devices (NVM11 through NVMmn) may operate under the control of the storage controller 210. For example, the first NVM device NVM11 may program or write the data DATAa in accordance with the command CMDa, the address ADDRa, and the data DATAa provided to the first channel CH1. For example, the second NVM device NVM21 may read the data DATAb in accordance with the command CMDb and the address ADDRb provided to the second channel CH2, and may transmit the data DATAb to the storage controller 210.

FIG. 3 illustrates that the NVM 220 communicates with the storage controller 210 via m channels and includes n NVM devices for each of the m channels, but the number of channels and the number of NVM devices connected to each of the channels may vary.

Figure 4:
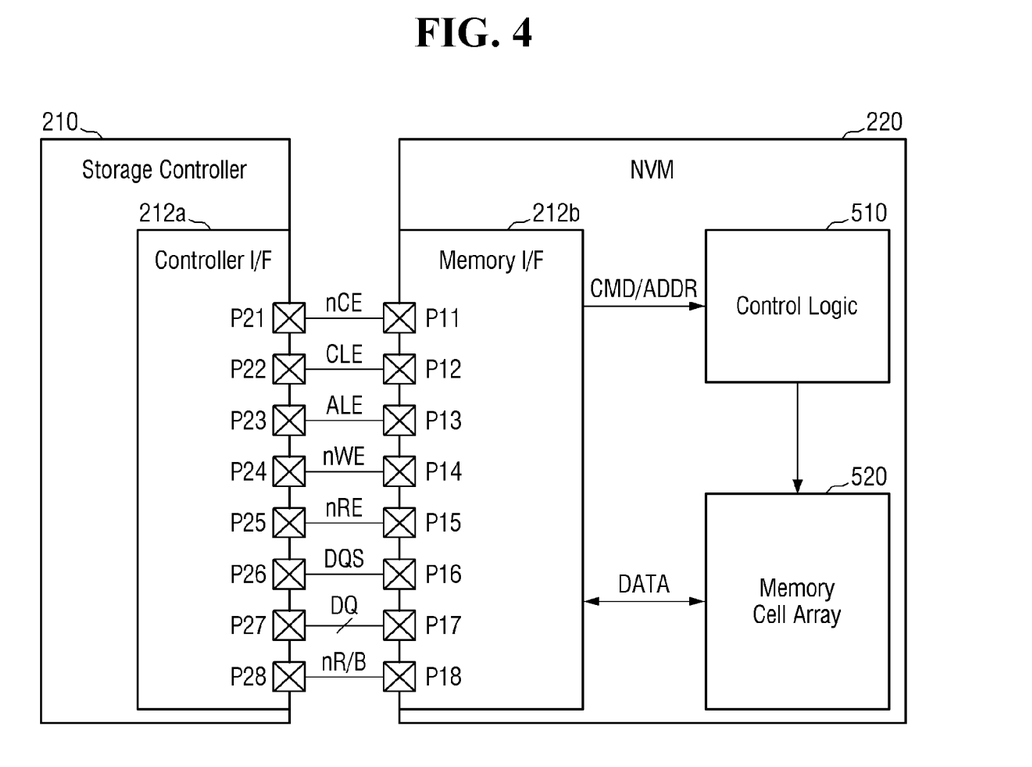
FIG. 4 is a block diagram illustrating the storage controller, a memory interface, and the NVM of FIG. 1.

FIG. 4 is a block diagram illustrating the storage controller, the memory interface, and the NVM of FIG. 1. The memory interface 212 of FIG. 1 may include a controller interface circuit 212a of FIG. 4.

The NVM 220 may include first through eighth pins P11 through P18, a memory interface circuit 212b, and a control logic circuit 510, and a memory cell array 520.

The memory interface circuit 212b may receive a chip enable signal nCE from the storage controller 210 via the first pin P11. The memory interface circuit 212b may transmit signals to, or receive signals from, the storage controller 210 via the second through eighth pins P12 through P18. For example, in a case where the chip enable signal nCE is enabled or has, for example, a low level, the memory interface circuit 212b may transmit signals to, or receive signals from the storage controller 210 via the second through eighth pins P12 through P18.

The memory interface circuit 212b may receive a command latch enable signal CLE, an address latch enable signal ALE, and a write enable signal nWE via the second through fourth pins P12 through P14. The memory interface circuit 212b may receive a data signal DQ from the storage controller 210, or transmit a data signal DQ to the storage controller 210, via the seventh pin P17. A command CMD, an address ADDR, and data "DATA" may be transmitted via data signals DQ. For example, a data signal DQ may be transmitted via multiple signal lines. In this example, the seventh pin P17 may include a plurality of pins corresponding to a plurality of data signals.

The memory interface circuit 212b may acquire the command CMD from a data signal DQ received during a period when the command latch enable signal CLE is enabled or has, for example, a high level, based on the toggle timings of the write enable signal nWE. The memory interface circuit 212b may acquire the address ADDR from a data signal DQ received during a period when the address latch enable signal ALE is enabled or has, for example, a high level, based on the toggle timings of the write enable signal nWE.

In some embodiments, the write enable signal nWE may maintain a static state (e.g., a high- or low-level state), and may toggle between the high- and low-level states. For example, the write enable signal nWE may toggle during the transmission of the command CMD or the address ADDR. Accordingly, the memory interface circuit 212b may acquire the command CMD or the address ADDR based on the toggle timings of the write enable signal nWE.

The memory interface circuit 212b may receive a read enable signal nRE from the storage controller 210 via the fifth pin P15. The memory interface circuit 212b may receive a data strobe signal DQS from the storage controller 210, or transmit a data strobe signal DQS to the storage controller 210, via the sixth pin P16.

During the output of the data "DATA" from the NVM 220, the memory interface circuit 212b may receive a read enable signal nRE that toggles, via the fifth pin P15. The memory interface circuit 212b may generate a data strobe signal DQS that toggles based on the toggling of the read enable signal nRE. For example, the memory interface circuit 212b may generate a data strobe signal DQS that toggles a predetermined delay (e.g., "tDQSRE") after the beginning of the toggling of the read enable signal NRE. The memory interface circuit 212b may transmit a data signal DQ including the data DQ based on the toggle timings of the generated data strobe signal DQS. Accordingly, the data "DATA" may be transmitted to the storage controller 210 in alignment with the toggle timings of the generated data strobe signal DQS.

During the input of the data "DATA" to the NVM 220, in a case where a data signal DQ including the data "DATA" is received from the storage controller 210, the memory interface circuit 212b may receive a data strobe signal DQS toggling with the data "DATA" from the storage controller 210. The memory interface circuit 212b may acquire the data "DATA" from the received data strobe signal DQS in accordance with the toggle timings of the received data strobe signal DQS. For example, the memory interface circuit 212b may acquire the data "DATA" by sampling the received data signal DQ at rising and falling edges of the received data strobe signal DQS.

The memory interface circuit 212b may transmit a ready/busy output signal nR/B to the storage controller 210 via the eighth pin P18. The memory interface 212b may transmit state information of the NVM 220 to the storage controller 210 via a ready/busy output signal nR/B. In a case where the NVM 220 is busy (i.e., an operation is being performed in the NVM 220), the memory interface circuit 212b may transmit a ready/busy output signal indicating the state of the NVM 220 being busy to the storage controller 210. In a case where the NVM 220 is ready (i.e., an operation is not being performed in the NVM 220 or is complete), the memory interface circuit 212b may transmit a ready/busy output signal nR/B indicating the state of the NVM 220 being ready to the storage controller 210.

For example, while the NVM 220 is reading the data "DATA" from the memory cell array 520 in response to a page read command, the memory interface circuit 212b may transmit a ready/busy output signal nR/B indicating that the NVM 220 is busy (or has, for example, a low level) to the storage controller 210. For example, while the NVM 220 is programming the data "DATA" to the memory cell array 520 in response to a program command, the memory interface circuit 212b may also transmit the ready/busy output signal nR/B indicating that the NVM 220 is busy to the storage controller 210.

A control logic circuit 510 may generally control various operations in the NVM 220. The control logic circuit 510 may receive the command CMD and/or the address ADDR acquired by the memory interface circuit 212b. The control logic circuit 510 may generate control signals for controlling the other elements of the NVM 220 in accordance with the command CMD and/or the address ADDR. For example, the control logic circuit 510 may generate various control signals for programming the data "DATA" to the memory cell array 520 or reading the data "DATA" from the memory cell array 520.

The memory cell array 520 may store the data "DATA" acquired by the memory interface circuit 212b under the control of the control logic circuit 510. The memory cell array 520 may output the stored data "DATA" to the memory interface circuit 212b under the control of the control logic circuit 510.

The memory cell array 520 may include a plurality of memory cells. For example, the memory cells may be flash memory cells, but the present disclosure is not limited thereto. In another example, the memory cells may be resistive random-access memory (RRAM) cells, ferroelectric random access memory (FRAM) cells, phase-change random access memory (PRAM) cells, thyristor random-access memory (TRAM) cells, or magnetic random-access memory (MRAM) cells. The memory cells of the memory cell array 520 will hereinafter be described as being NAND flash memory cells.

The storage controller 210 may include first through eighth pins P21 through P28 and the controller interface circuit 212a. The first through eighth pins P21 through P28 may correspond to the first through eighth pins P11 through P18 of the NVM 220.

The control interface circuit 212a may transmit the chip enable signal nCE to the NVM 220 via the first pin P21. The controller interface circuit 212a may transmit signals to, or receive signals from, an NVM 220 selected by the chip enable signal nCE.

The controller interface circuit 212a may transmit the command latch enable signal CLE, the address latch enable signal ALE, and the write enable signal nWE via the second through fourth pins P22 through P24. The controller interface circuit 212a may transmit a data signal DQ to, or receive a data signal DQ from, the NVM 220.

The controller interface circuit 212a may transmit via the seventh pin P27 a data signal DQ including the command CMD or the address ADDR to the NVM 220 together with a write enable signal nWE that toggles. As an enabled command latch enable signal CLE is transmitted, the controller interface circuit 212a may transmit a data signal DQ including the command CMD to the NVM 220. As an enabled address latch enable signal ALE is transmitted, the controller interface circuit 212a may transmit a data signal DQ including the address ADDR to the NVM 220.

The controller interface circuit 212a may transmit the read enable signal nRE to the NVM 220 via the fifth pin P25. The controller interface circuit 212a may receive a data strobe signal DQS from, or transmit a data strobe signal DQS to, the NVM 220 via the sixth pin P26.

During the output of the data "DATA" from the NVM 220, the controller interface circuit 212a may generate a read enable signal nRE that toggles and may transmit the generated read enable signal nRE to the NVM 220. For example, the controller interface circuit 212a may generate a read enable signal nRE that is to be changed from a fixed state (e.g., a high- or low-level state) to a toggle state before the output of the data "DATA" from the NVM 220. As a result, a data strobe signal DQS toggling with the read enable signal nRE may be generated in the NVM 220. The controller interface circuit 212a may receive the data strobe signal DQS and a data signal DQ including the data "DATA" from the NVM 220. The controller interface circuit 212a may acquire the data "DATA" from the received data signal DQ based on the toggle timings of the received data strobe signal DQS.

During the input of the data "DATA" to the NVM 220, the controller interface circuit 212a may generate a data strobe signal DQS that toggles. For example, the controller interface circuit 212a may generate a data strobe signal DQS that is to be changed from a fixed state (e.g., a high- or low-level state) to a toggle state before the transmission of the data "DATA". The controller interface circuit 212a may transmit a data signal DQ including the data "DATA" to the NVM 220 based on the toggle timings of the generated data strobe signal DQS.

The controller interface circuit 212a may receive a ready/busy output signal nR/B from the NVM 220 via the eighth pin P28. The controller interface circuit 212a may identify the state of the NVM 220 based on the ready/busy output signal nR/B.

Figure 5:
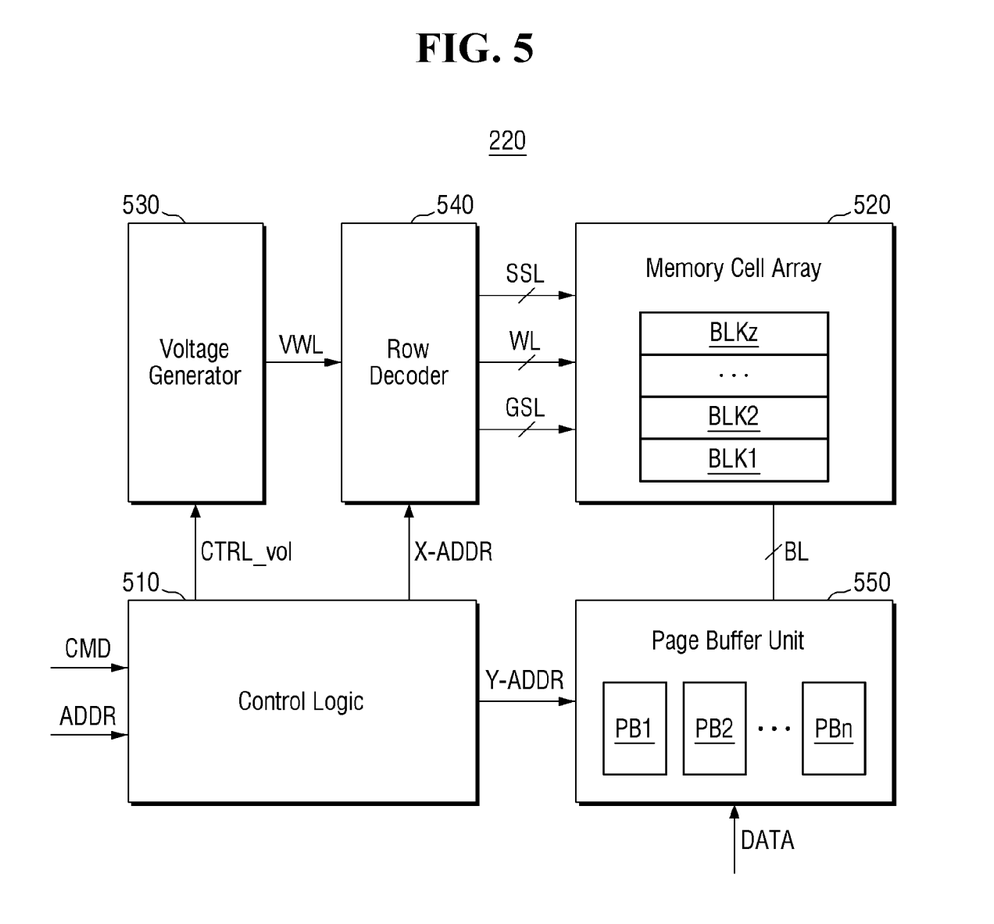
FIG. 5 is a block diagram of the NVM of FIG. 4.

FIG. 5 is a block diagram of the NVM of FIG. 4.

Referring to FIG. 5, the NVM 220 may include the control logic circuit 510, the memory cell array 520, a page buffer unit 550, a voltage generator 530, and a row decoder 540. Although not specifically illustrated in FIG. 5, the NVM 220 may further include the memory interface circuit 212b of FIG. 4, a column logic, a predecoder, a temperature sensor, a command decoder, and an address decoder.

The control logic circuit 510 may generally control various operations in the NVM 220. The control logic circuit 510 may output various control signals in response to the command CMD and/or the address ADDR from the memory interface circuit 212b of FIG. 4. For example, the control logic circuit 510 may output a voltage control signal CTRL_vol, a row address X-ADDR, and a column address Y-ADDR.

The memory cell array 520 may include a plurality of first through z-th memory blocks BLK1 through BLKz (where z is a positive integer), and each of the first through z-th memory blocks BLK1 through BLKz may include a plurality of memory cells. The memory cell array 520 may be connected to the page buffer unit 550 via bitlines BL and may be connected to the row decoder 540 via wordlines WL, string selection lines SSL, and ground selection lines GSL.

In exemplary embodiments, the memory cell array 520 may include a 3D memory cell array, and the 3D memory cell array may include a plurality of NAND strings. Each of the NAND strings may include memory cells connected to each of wordlines that are vertically stacked on a substrate. In exemplary embodiments, the memory cell array 520 may include a two-dimensional (2D) memory cell array, and the 2D memory cell array may include a plurality of NAND strings that are arranged in row and column directions.

The page buffer unit 550 may include a plurality of first through n-th page buffers PB1 through PBn (where n is an integer of 3 or greater), and the first through n-th page buffers PB1 through PBn may be connected to the memory cells via a plurality of bitlines BL. The page buffer unit 550 may select at least one of the bitlines BL in response to the column address Y-ADDR. The page buffer unit 550 may operate as a write driver or a sense amplifier depending on its operating mode. For example, during a program operation, the page buffer unit 550 may apply a bitline voltage corresponding to data to be programmed to the selected bitline(s) BL. During a read operation, the page buffer unit 550 may sense a current or voltage from the selected bitline(s) BL to sense data stored in memory cells.

The voltage generator 530 may generate various types of voltages for performing program, read, and erase operations based on the voltage control signal CTRL_vol. For example, the voltage generator 530 may generate a program voltage, a read voltage, a program verification voltage, and an erase voltage as wordline voltages VWL.

The row decoder 540 may select one of the wordlines WL in response to the row address X-ADDR and may select one of the string selection lines SSL. For example, the row decoder 540 may apply the program voltage and the program verification voltage to the selected wordline WL during a program operation and may apply the read voltage to the selected wordline WL during a read operation.

Figure 6:
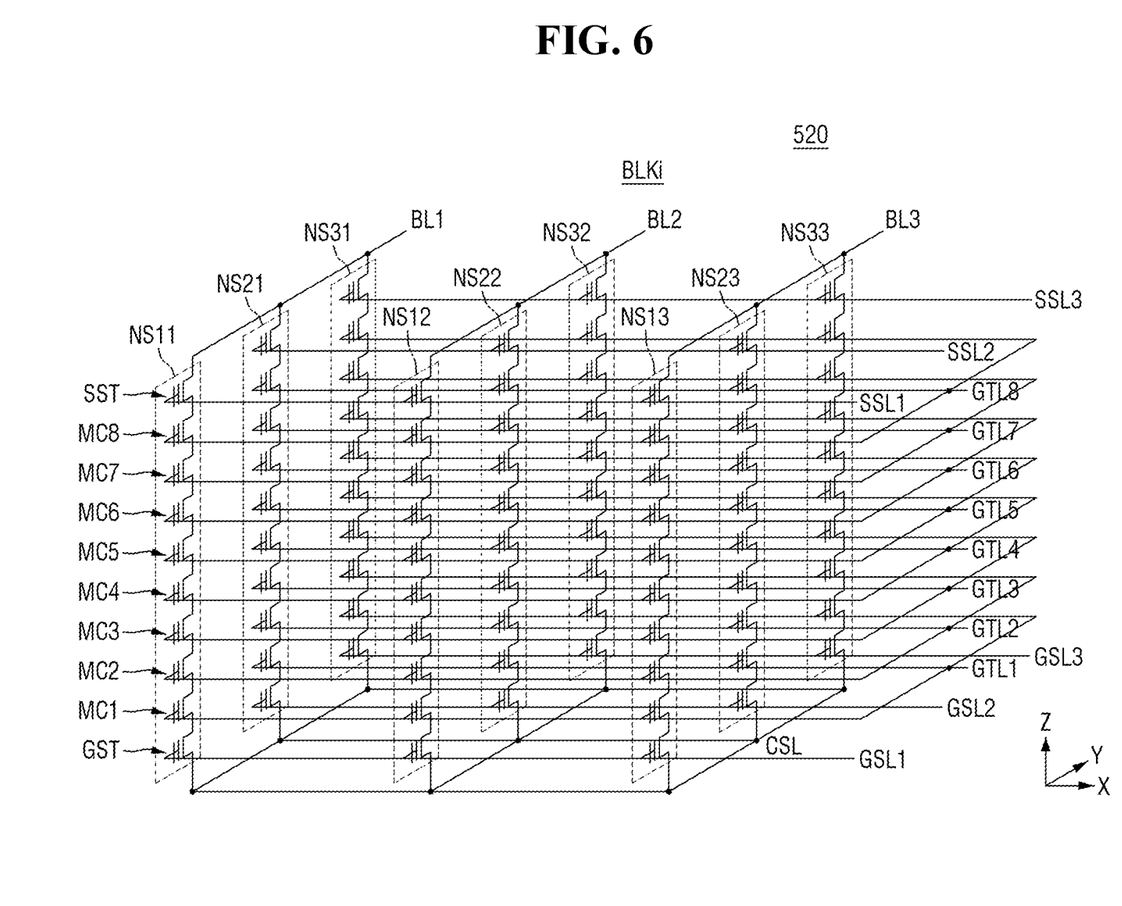
FIG. 6 illustrates a three-dimensional (3D) vertical NAND (V-NAND) structure that is applicable to an NVM according to some embodiments of the present disclosure.

FIG. 6 illustrates a 3D V-NAND structure that is applicable to an NVM according to some embodiments of the present disclosure. In a case where a storage module of a storage device is implemented as a 3D V-NAND-type flash memory, each of a plurality of memory blocks that form the storage module may be represented as an equivalent circuit of FIG. 6.

Referring to FIG. 6, an i-th memory block BLKi may be a 3D memory block formed on a substrate as a 3D structure. For example, a plurality of memory NAND strings included in the i-th memory block BLKi may be formed in a vertical direction with respect to the substrate.

The i-th memory block BLKi may include a plurality of memory NAND strings (NS11 through NS33), which are connected between a common source line CSL and first through third bitlines BL1 through BL3. Each of the memory NAND strings (NS11 through NS33) may include a string selection transistor SST, a plurality of first through eighth memory cells MC1 through MC8, and a ground selection transistor GST. FIG. 6 illustrates that each of the memory NAND strings (NS11 through NS33) includes eight memory cells, but the present disclosure is not limited thereto.

The string selection transistor SST may be connected to corresponding one of first through third string selection lines SSL1, SSL2, and SSL3. The first through eighth memory cells MC1 through MC8 may be connected to first through eighth gate lines GTL1 through GTL8, respectively. The first through eighth gate lines GTL1 through GTL8 may correspond to wordlines, and some of the first through eighth gate lines GTL1 through GTL8 may be dummy wordlines. The ground selection transistor GST may be connected to one of first through third ground selection lines GSL1 through GSL3. The string selection transistor SST may be connected to one of the first through third bitlines BL1 through BL3, and the ground selection transistor GST may be connected to the common source line CSL.

Wordlines of the same height may be connected in common, the first through third ground selection lines GSL1 through GSL3 may be separated from one another, and the first through third string selection lines SSL1 through SSL3 may be separated from one another. FIG. 6 illustrates that the i-th memory block BLKi is connected to eight gate lines and three bitlines, but the present disclosure is not limited thereto.

Figure 7:
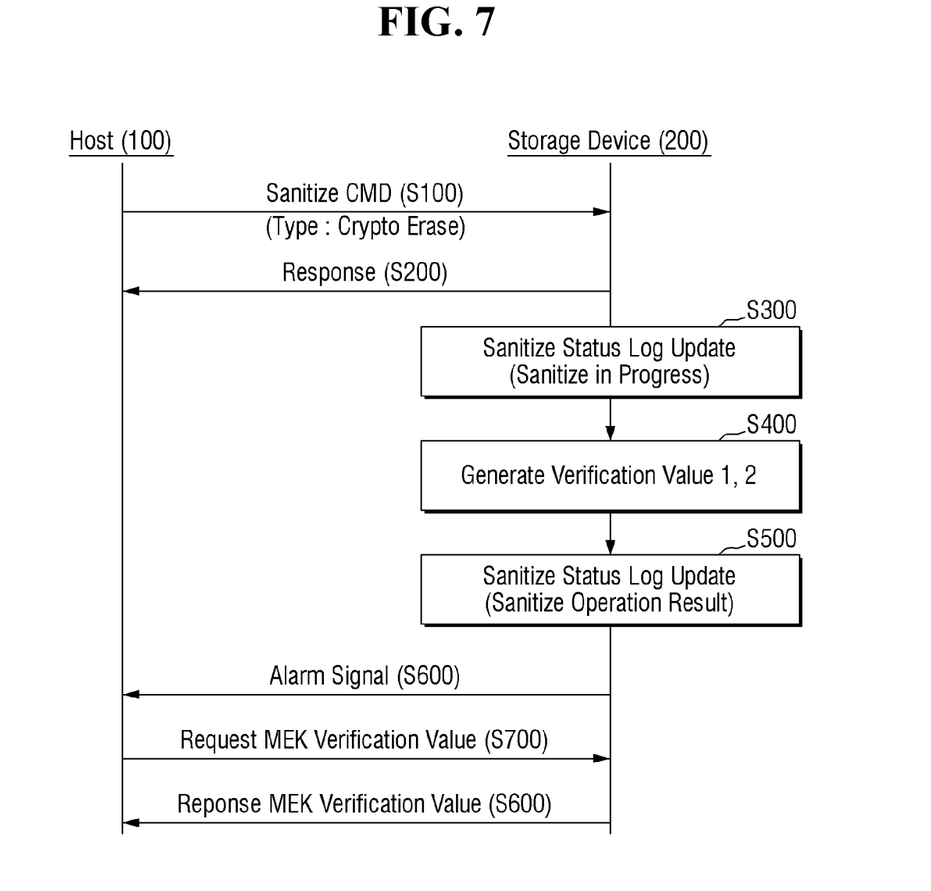
FIG. 7 is a flowchart illustrating an operating method of a storage device according to some embodiments of the present disclosure.

FIG. 7 is a flowchart illustrating an operating method of a storage device according to some embodiments of the present disclosure.

Referring to FIGS. 1 and 7, the host device 100 transmits a command giving instructions to sanitize data with the use of a cryptographic erase to the storage device 200 (S100).

For example, the command may be received by the storage controller 210 via the host interface 211 of the storage device 200.

Thereafter, the storage controller 210 of the storage device 200 transmits a response signal indicating that the command has been received to the host device 100 (S200).

Thereafter, in response to the command, the storage controller 210 of the storage device 200 updates a status log to indicate that a data sanitization process is in progress (S300).

Thereafter, the storage controller 210 of the storage device 200 generates first and second verification values to verify whether a data sanitization operation using a cryptographic erase has been performed in the storage device 200 (S400).

The generation of the first and second verification values will hereinafter be described with reference to FIGS. 8 through 13.

Figure 8:
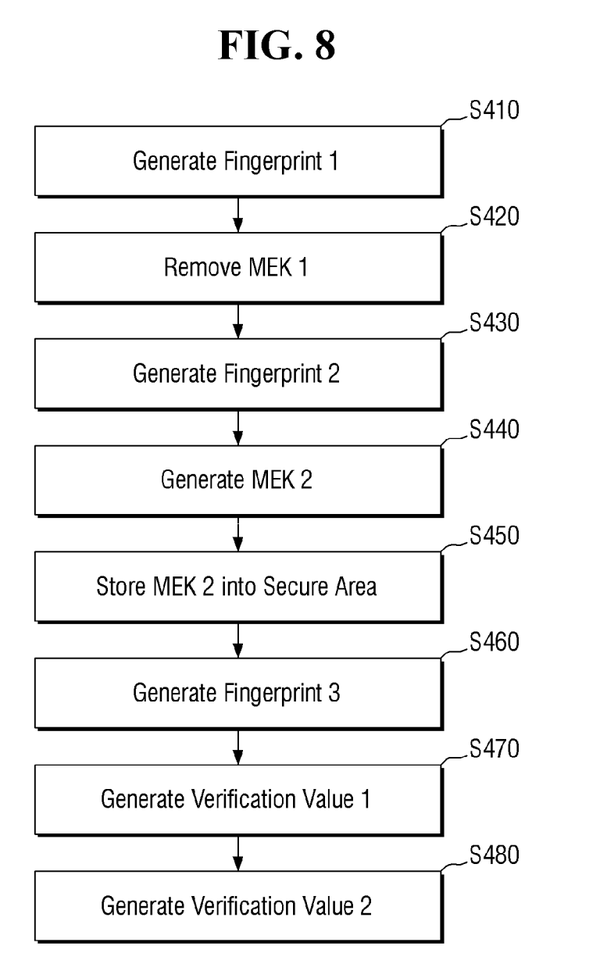
FIG. 8 is a flowchart illustrating S400 of FIG. 7.

FIG. 8 is a flowchart illustrating S400 of FIG. 7. FIGS. 9 through 13 illustrate S470 and S480 of FIG. 8.

Referring to FIG. 8, a first fingerprint FP1 is generated (S410).

Figure 9:
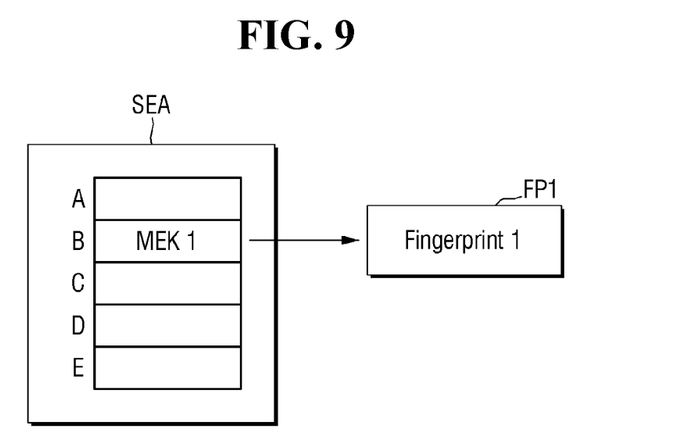
FIGS. 9 through 13 illustrate S470 and S480 of FIG. 8.

For example, referring to FIGS. 2 and 9, a first MEK "MEK1" to be deleted in response to the command from the host device 100 may be stored at address B among addresses A through E in the secure area SEA.

For example, the fingerprint generation module 214a of the cryptographic erase module 214 may calculate a hash value for data stored at address B in the secure area SEA and may output the hash value as the first fingerprint FP1.

Here, as the data stored at address B in the secure area SEA is the first MEK "MEK1", the first fingerprint FP1 may be a hash value for the first MEK "MEK1".

Thereafter, referring to FIG. 8, the first MEK "MEK1" is deleted (S420). Thereafter, a second fingerprint FP2 is generated (S430).

Figure 10:
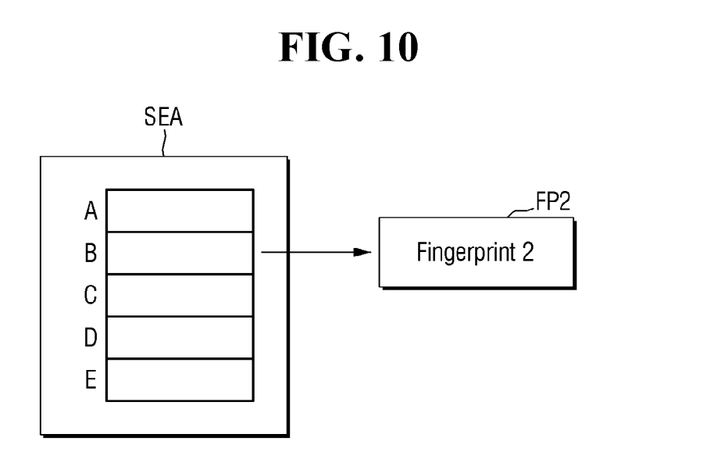

For example, referring to FIGS. 2 and 10, the cryptographic erase module 214 may delete the first MEK "MEK1" stored at address B in the secure area SA. Then, the fingerprint generation module 214a of the cryptographic erase module 214 may calculate a hash value for the data stored at address B in the secure area SEA and may output the hash value as a second fingerprint FP2.

As no MEK is currently stored at address B in the secure area SEA, the second fingerprint FP2 may be a hash value for data at address B in the secure area B where no MEK is stored (e.g., a blank state).

Thereafter, referring to FIG. 8, a second MEK "MEK2" is generated (S440). Thereafter, the second MEK is stored in the secure area SEA (S450).

Figure 11:
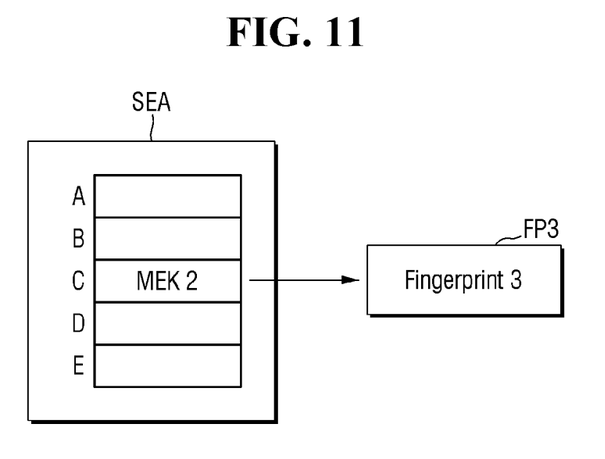

For example, referring to FIGS. 2 and 11, the key generation module 214b of the cryptographic erase module 214 may generate the second MEK "MEK2" by using, for example, a random number generator.

The cryptographic erase module 214 may store the second MEK "MEK2" at address C in the secure area SEA. That is, the address from which the first MEK "MEK1" is deleted and the address at which the second MEK "MEK2" is newly stored may differ from each other. This address information may be controlled by the cryptographic erase module 214. By storing MEKs at different addresses, the reliability of security can be improved.

Thereafter, referring to FIG. 8, a third fingerprint FP3 is generated (S460).

For example, referring to FIGS. 2 and 11, the fingerprint generation module 214a of the cryptographic erase module 214 may calculate a hash value for data stored at address C in the secure area SEA and may output the hash value as the third fingerprint FP3.

Here, as the data stored at address C in the secure area SEA is the second MEK "MEK2", the third fingerprint FP3 may be a hash value for the second MEK "MEK2".

Thereafter, referring to FIG. 8, a first verification value VV1 is generated (S470).

Figure 12:
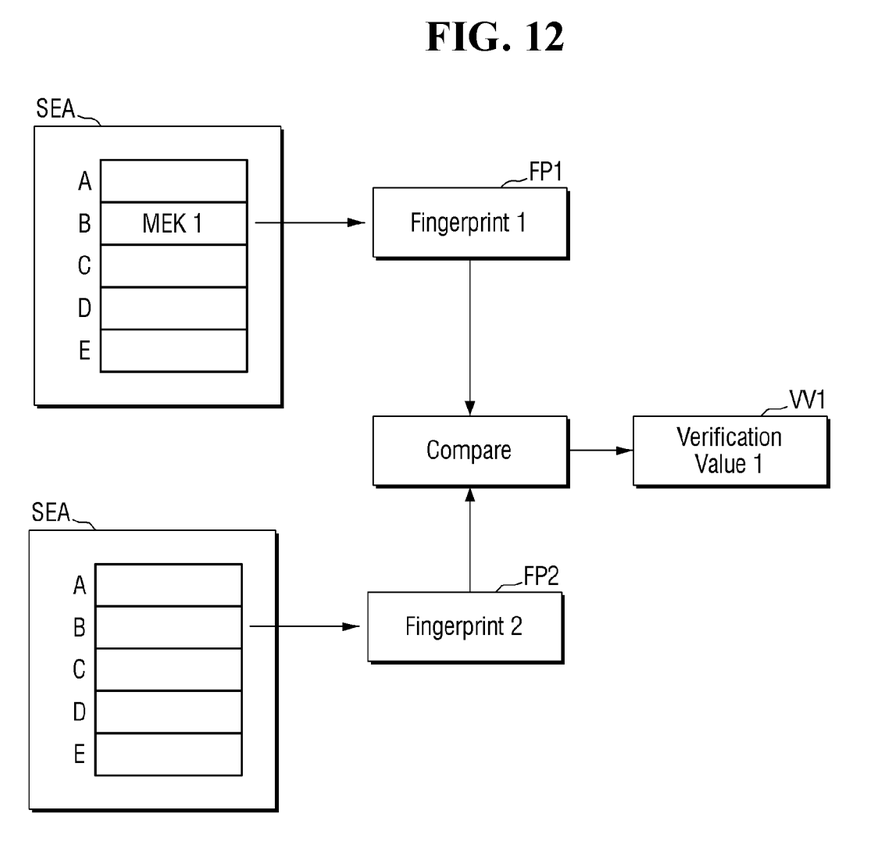

For example, referring to FIGS. 2 and 12, the verification value generation module 214c of the cryptographic erase module 214 may generate the first verification value VV1 by comparing the first and second fingerprints FP1 and FP2.

If the first and second fingerprints FP1 and FP2 are identical, it means that the first MEK "MEK1" has not been deleted from address B in the secure area SEA. In this case, the verification value generation module 214c of the cryptographic erase module 214 may generate a first verification value VV1 of 0 to indicate that the first MEK "MEK1" has not been deleted from the secure area SEA.

On the contrary, if the first and second fingerprints FP1 and FP2 are different, it means that the first MEK "MEK1"

has been deleted from address B or at least other data has been modified. In this case, the verification value generation module 214c of the cryptographic erase module 214 may generate a first verification value VV1 of 1 to indicate that the first MEK "MEK1" has been deleted from the secure area SEA.

Thereafter, referring to FIG. 8, a second verification value VV2 is generated (S480).

Figure 13:
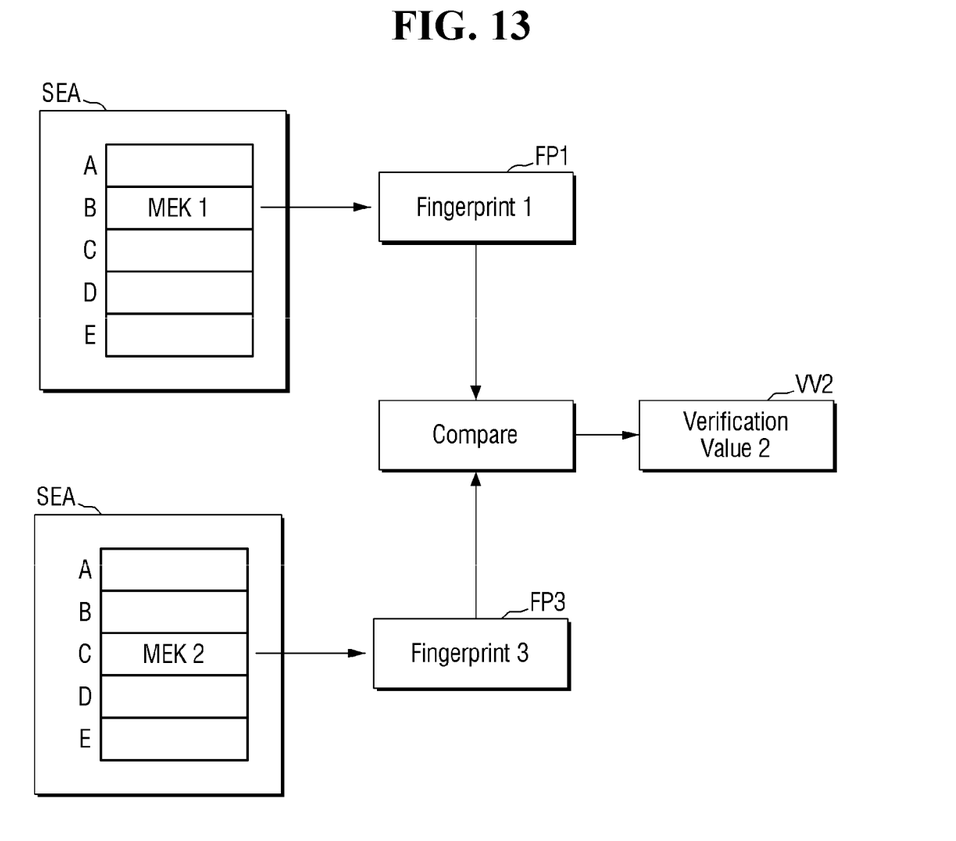

For example, referring to FIGS. 2 and 13, the verification value generation module 214c of the cryptographic erase module 214 may generate the second verification value VV2 by comparing the first and third fingerprints FP1 and FP3.

If the first and third fingerprints FP1 and FP3 are identical, it means that the first MEK "MEK1" has not been replaced with the new second MEK "MEK2". In this case, the verification value generation module 214c of the cryptographic erase module 214 may generate a second verification value VV2 of 0 to indicate that a new MEK has not been stored in the secure area SEA.

On the contrary, if the first and third fingerprints FP1 and FP3 are different, it means that the first MEK "MEK1" has been replaced with the new second MEK "MEK2". In this case, the verification value generation module 214c of the cryptographic erase module 214 may generate a second verification value VV2 of 1 to indicate that a new MEK has been stored in the secure area SEA.

For convenience, FIG. 8 illustrates steps of the operation of the cryptographic erase module 214 in a particular order, but the embodiments of present disclosure are not limited thereto.

That is, for example, in some embodiments, S440 may be performed before S410, or S440 may be performed between S420 and S430. That is, the operation of the cryptographic erase module 214 may be performed in various orders or combinations.

Referring again to FIGS. 1 and 7, after the generation of the first and second verification values VV1 and VV2, the storage controller 210 of the storage device 200 may update the status log to indicate that the data sanitization process has been completed (S500).

Thereafter, the storage controller 210 of the storage device 200 transmits a notification signal indicating that the generation of the first and second verification values VV1 and VV2 has been completed to the host device 100 (S600).

Although not specifically illustrated in FIG. 7, in some embodiments, the notification signal may be a signal transmitted by the storage device 200 to the host device 100 before S100 as a response to a request signal from the host device 100.

However, the embodiments of present disclosure are not limited to this. Alternatively, a method to transmit the notification signal to the host device 100 may vary.

In response to the notification signal being received, the host device 100 transmits a request signal requesting the first and second verification signals VV1 and VV2 to the storage device 200 (S700).

The storage controller 210 of the storage device 200 transmits the first and second verification values VV1 and VV2 to the host device 100 in response to the request signal from the host device 100 (S800).

The host device 100 may identify, from the first verification value VV1, that an existing MEK stored in the storage device 200 has been deleted and may identify, from the second verification value VV2, that a new MEK has been stored in the storage device 200. That is, the host device 100 may identify that the data sanitization operation using a cryptographic erase has been successfully performed in the storage device 200.

The MEKs, as well as the first through third fingerprints FP1 through FP3 used in generating the first and second verification values VV1 and VV2, may be stored in the storage device 200 rather than being transmitted to the host device 100. Accordingly, as MEKs that have already been deleted or newly generated cannot be identified with the use of fingerprints from outside the storage device 200, the security reliability of the storage system 10 can be improved.

Embodiments of the present disclosure have been described above with reference to the accompanying drawings, but the present disclosure is not limited thereto and may be implemented in various different forms. It will be understood that the present disclosure can be implemented in other specific forms without changing the technical spirit or gist of the present disclosure. Therefore, it should be understood that the embodiments set forth herein are illustrative in all respects and not limiting.

What is claimed is:

1. A storage device comprising:
  a nonvolatile memory (NVM); and
  a storage controller configured to control the nonvolatile memory,
  wherein the storage controller is further configured to:
    receive, from a host device, a command giving instructions to sanitize data with the use of a cryptographic erase; and
    in response to the command from the host device, transmit to the host device a first verification value indicative of whether a first media encryption key (MEK) stored in the NVM has been deleted and a second verification value indicative of whether a second MEK, which is different from the first MEK, has been generated and stored in the NVM.

2. The storage device of claim 1, wherein the storage controller is further configured to: generate first, second, and third fingerprints, which are different from one another; and generate the first and second verification values based on the first, second, and third fingerprints.

3. The storage device of claim 2, wherein:
  the first verification value is generated based on a result of comparing the first and second fingerprints, and
  the second verification value is generated based on a result of comparing the first and third fingerprints.

4. The storage device of claim 2, wherein the storage controller is configured to transmit the first and second verification values to the host device, but is configured to not transmit the first, second, and third fingerprints to the host device.

5. The storage device of claim 1, wherein:
  the first MEK is stored at a first address of the NVM, and
  in response to the command from the host device, the storage controller is configured to:
    generate a first fingerprint for data stored at the first address of the NVM;
    delete the first MEK from the first address of the NVM;
    generate a second fingerprint for the data stored at the first address of the NVM;
    generate the second MEK and store the second MEK at a second address of the NVM, the second address being different from the first address;
    generate a third fingerprint for data stored at the second address of the NVM;

generate the first verification value by comparing the first and second fingerprints; and
generate the second verification value by comparing the first and third fingerprints.

6. The storage device of claim 5, wherein:
the first and second fingerprints comprise hash values for the data stored at the first address of the NVM, and
the third fingerprint comprises a hash value for the data stored at the second address of the NVM.

7. The storage device of claim 1, wherein the NVM comprises a user area, which is accessible to the host device and is configured to store data provided from the host device, and a secure area, which is inaccessible to the host device and is configured to store the first and second MEKs.

8. The storage device of claim 7, wherein the storage controller comprises a cryptographic erase module configured to perform a cryptographic erase operation to delete one or more MEKs stored in the secure area of the NVM, and wherein the cryptographic erase module comprises a fingerprint generation module configured to generate a fingerprint for data stored at a particular address in the NVM, a key generation module configured to generate one or more MEKs to be stored in the secure area of the NVM, and a verification value generation module configured to generate verification values based on fingerprints generated by the fingerprint generation module.

9. The storage device of claim 7, wherein the storage controller comprises an advanced encryption standard (AES) engine configured to encrypt the data provided from the host device with an MEK stored in the secure area of the NVM and store the encrypted data in the user area of the NVM.

10. A method of operating a storage device comprising a nonvolatile memory (NVM) configured to store a first media encryption key (MEK) at a first address, the method comprising:
receiving a command to sanitize data by using a cryptographic erase from a host device, and
in response to the command from the host device, transmitting, to the host device, a first verification value indicative of whether the first media encryption key (MEK) stored in the NVM has been deleted and a second verification value indicative of whether a second MEK, which is different from the first MEK, has been generated and stored in the NVM.

11. The method of claim 10, further comprising:
in response to the command from the host device, updating a status log to indicate that a data sanitization process is in progress; and
after generating the first and second verification values, updating the status log to indicate that the data sanitization process has been completed.

12. The method of claim 11, further comprising:
before the updating of the status log to indicate that the data sanitization process is in progress, transmitting a response signal from the storage device to the host device in response to the command from the host device; and
after the updating of the status log to indicate that the data sanitization process has been completed, transmitting a notification signal from the storage device to the host device, the notification signal being indicative of whether the generation of the first and second verification values has been completed.

13. The method of claim 12, further comprising:
receiving a request signal from the host device requesting the first and second verification values as a response to the notification signal; and
transmitting the first and second verification values to the host device in response to the request signal.

14. The method of claim 10, further comprising:
generating first, second, and third fingerprints, which are different from one another, and generating the first and second verification values based on the first, second, and third fingerprints.

15. The method of claim 14, wherein:
the first fingerprint is a hash value for the first MEK stored at the first address,
the second fingerprint is a hash value for data stored at the first address after the deletion of the first MEK from the first address, and
the third fingerprint is a hash value for the second MEK which has been stored at a second address of the NVM.

16. The method of claim 15, wherein:
the generating of the first verification value comprises generating the first verification value based on a result of comparing the first and second fingerprints, and
the generating of the second verification value comprises generating the second verification value based on a result of comparing the first and third fingerprints.

17. The method of claim 10, further comprising:
in response to the command from the host device, generating a first fingerprint for data stored at the first address of the NVM;
deleting the first MEK from the first address of the NVM;
generating a second fingerprint for the data stored at the first address of the NVM;
generating the second MEK and storing the second MEK at a second address of the NVM;
generating a third fingerprint for data stored at the second address of the NVM;
generating the first verification value by comparing the first and second fingerprints; and
generating the second verification value by comparing the first and third fingerprints.

18. A method of operating a host device, comprising:
transmitting, to a storage device including a nonvolatile memory (NVM), a command giving instructions to sanitize data with the use of a cryptographic erase; and
receiving, from the storage device, a first verification value indicative of whether a first media encryption key (MEK) stored in the NVM has been deleted and a second verification value indicative of whether a second MEK, which is different from the first MEK, has been generated and stored in the NVM.

19. The method of claim 18, further comprising:
receiving, from the storage device, a notification signal indicative of whether a data sanitization operation using the cryptographic erase has been completed; and
transmitting to the storage device a request signal requesting the first and second verification values,
wherein the receiving of the first and second verification values comprises receiving the first and second verification values as a response to the request signal.

20. The operating method of claim 18, further comprising generating the first and second verification values based on first, second, and third fingerprints, which are different from one another.

* * * * *